(12) United States Patent
Iwadare et al.

(10) Patent No.: US 9,045,128 B2
(45) Date of Patent: Jun. 2, 2015

(54) DRIVE SYSTEM

(75) Inventors: Mitsuhiro Iwadare, Saitama (JP); Satoshi Kodo, Saitama (JP); Tsunehiro Kobayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 14/122,814

(22) PCT Filed: May 21, 2012

(86) PCT No.: PCT/JP2012/062898
§ 371 (c)(1),
(2), (4) Date: Nov. 27, 2013

(87) PCT Pub. No.: WO2012/165188
PCT Pub. Date: Dec. 6, 2012

(65) Prior Publication Data
US 2014/0114540 A1 Apr. 24, 2014

(30) Foreign Application Priority Data
Jun. 2, 2011 (JP) .................. 2011-124082

(51) Int. Cl.
*B60W 10/06* (2006.01)
*B60W 10/101* (2012.01)
*B60W 30/18* (2012.01)
*B60W 10/02* (2006.01)

(52) U.S. Cl.
CPC ............ *B60W 10/06* (2013.01); *B60W 10/101* (2013.01); *B60W 30/18072* (2013.01); *B60W 2710/0644* (2013.01); *B60W 2710/1005* (2013.01); *B60Y 2300/424* (2013.01); *B60W 10/02* (2013.01)

(58) Field of Classification Search
CPC ... B60W 10/02; B60W 10/06; B60W 10/101; B60W 10/10; B60W 20/30–20/40; B60W 30/14–30/146; B60W 30/18072; B60W 2030/18081–2030/1809; B60W 50/06; B60W 2710/02–2710/021; B60W 2710/0644–2710/0655; B60W 2710/1005; B60W 2510/0638–2510/0647; B60K 6/36; B60K 6/383; B60K 6/24; B60Y 2300/424; B60Y 2400/427
See application file for complete search history.

(56) References Cited

U.S. PATENT DOCUMENTS

| | | | |
|---|---|---|---|
| 5,393,278 A * | 2/1995 | Kyushima et al. | ............ 477/120 |
| 6,019,699 A * | 2/2000 | Hoshiya et al. | ................. 477/20 |
| 6,376,927 B1 * | 4/2002 | Tamai et al. | ................ 290/40 C |

(Continued)

FOREIGN PATENT DOCUMENTS

| JP | 10-324178 A | 12/1998 |
|---|---|---|
| JP | 2008-222175 A | 9/2008 |

(Continued)

*Primary Examiner* — Bao Long T Nguyen
(74) *Attorney, Agent, or Firm* — Squire Patton Boggs (US) LLP

(57) ABSTRACT

Provided is a drive system that enables a reduction in the rise time of foot axis torque even if the drive system has a one-way clutch. The drive system includes a one-way clutch between a transmission and an output shaft. When a coasting determination unit determines to perform a coasting control, a control unit executes the coasting control by reducing the engine rotation speed of an internal combustion engine or stopping the engine rotation to bring the one-way clutch into a non-transmission state, and changing the transmission gear ratio of the transmission to a transmission gear ratio smaller than the transmission gear ratio calculated by a calculation unit.

11 Claims, 12 Drawing Sheets

(56) References Cited

U.S. PATENT DOCUMENTS

| | | | |
|---|---|---|---|
| 6,432,025 B1* | 8/2002 | Kondo et al. | 477/110 |
| 6,616,569 B2* | 9/2003 | Hoang et al. | 477/3 |
| 7,690,457 B2* | 4/2010 | Nakanowatari | 180/65.265 |
| 8,116,951 B2* | 2/2012 | Holmes | 701/51 |
| 2002/0035013 A1* | 3/2002 | Saito | 477/120 |
| 2003/0027686 A1* | 2/2003 | Shibata et al. | 477/107 |
| 2006/0003867 A1 | 1/2006 | Inagaki et al. | |
| 2007/0043496 A1 | 2/2007 | Ogawa | |
| 2010/0023230 A1* | 1/2010 | Holmes | 701/51 |
| 2010/0063694 A1* | 3/2010 | Lee et al. | 701/54 |
| 2010/0250074 A1* | 9/2010 | Hirasako et al. | 701/55 |
| 2010/0292048 A1 | 11/2010 | Oshima | |
| 2011/0015037 A1* | 1/2011 | Koenig | 477/121 |
| 2011/0035090 A1* | 2/2011 | Noguchi et al. | 701/29 |
| 2011/0125375 A1* | 5/2011 | Tokura et al. | 701/51 |

FOREIGN PATENT DOCUMENTS

| | | |
|---|---|---|
| JP | 2009-197981 A | 9/2009 |
| JP | 2010-203544 A | 9/2010 |

* cited by examiner

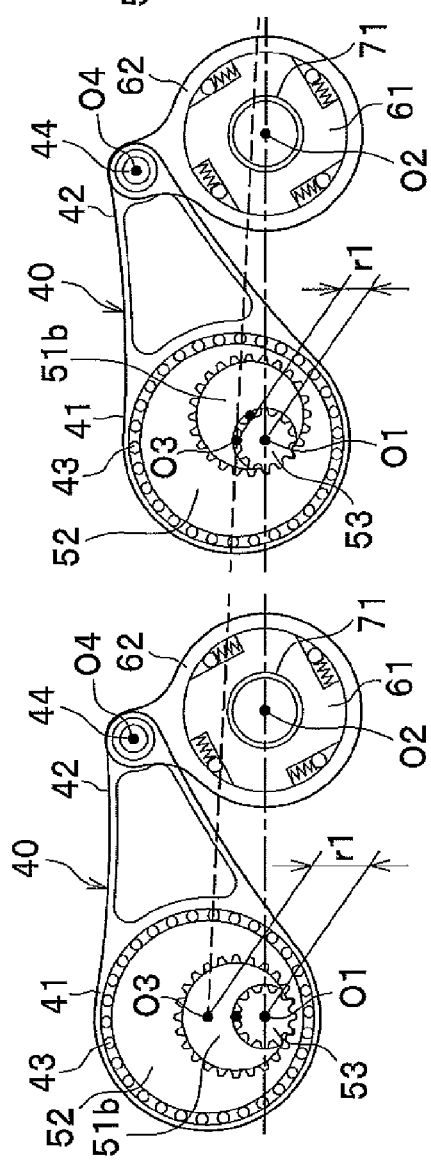

<ROTATION RADIUS r1=MAXIMUM, TRANSMISSION GEAR RATIO i=SMALL>

<ROTATION RADIUS r1=MEDIUM, TRANSMISSION GEAR RATIO i=MEDIUM>

<ROTATION RADIUS r1=0, TRANSMISSION GEAR RATIO i=∞>

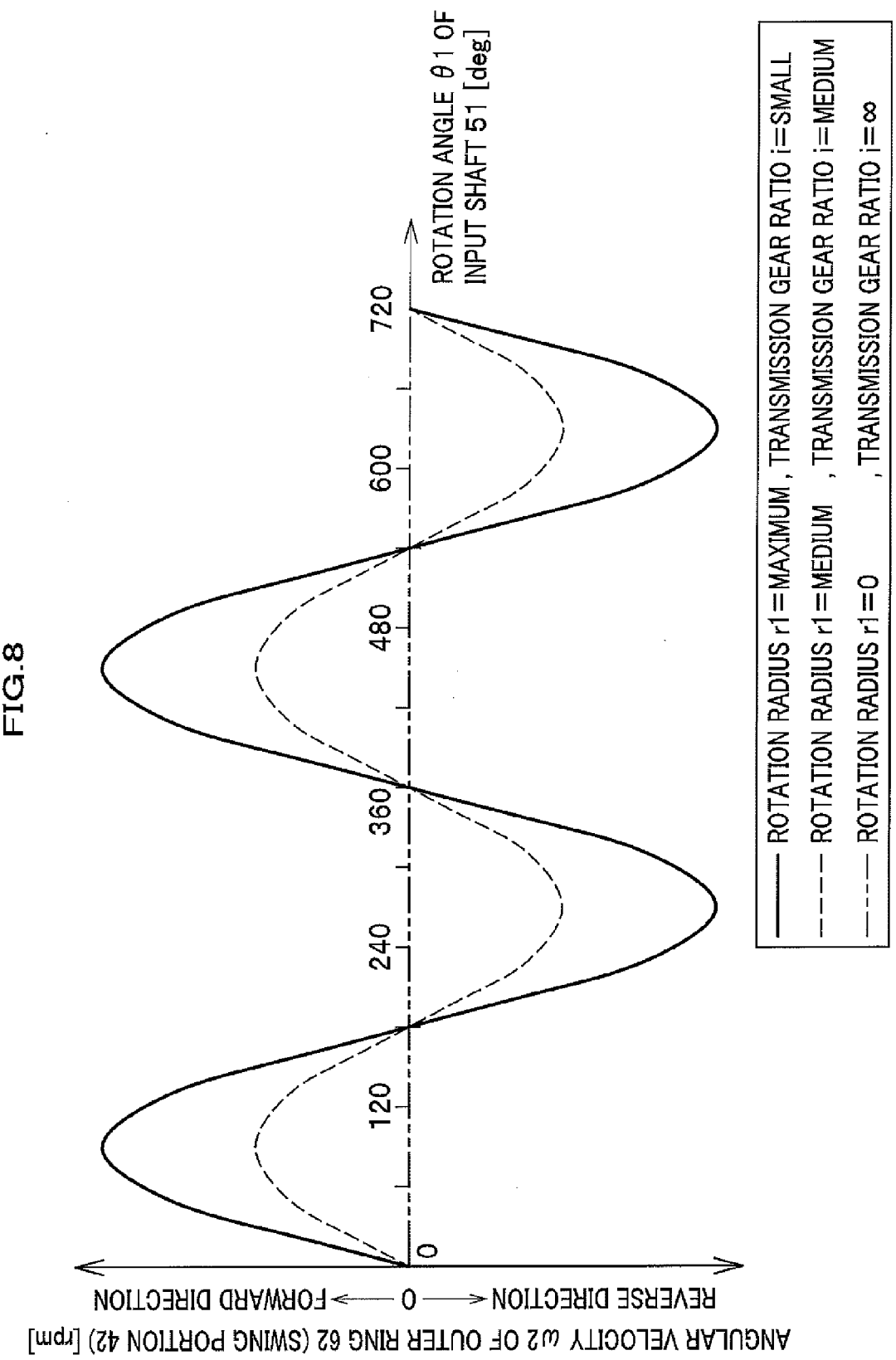

FIG.12A VEHICLE SPEED

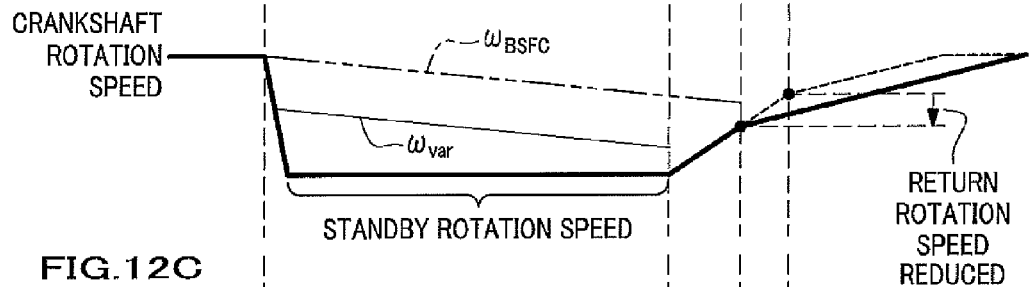

FIG.12B CRANKSHAFT ROTATION SPEED $\omega_{BSFC}$
$\omega_{var}$
STANDBY ROTATION SPEED
RETURN ROTATION SPEED REDUCED

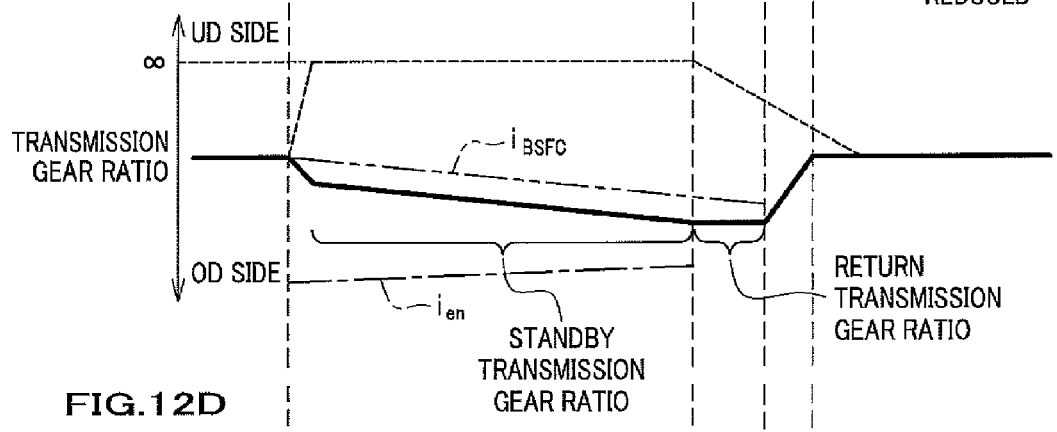

FIG.12C TRANSMISSION GEAR RATIO $i_{BSFC}$
$i_{en}$
STANDBY TRANSMISSION GEAR RATIO
RETURN TRANSMISSION GEAR RATIO

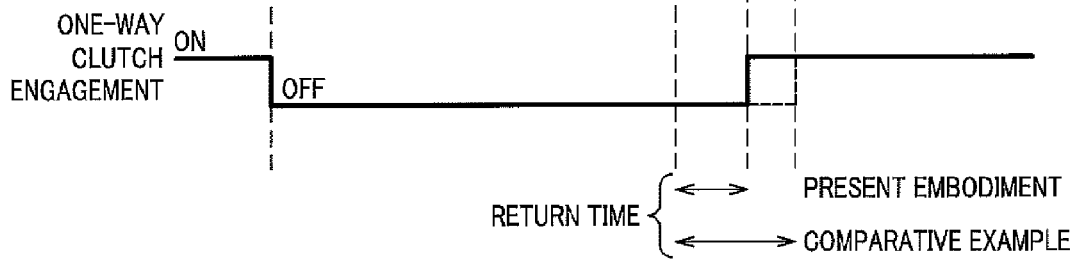

FIG.12D ONE-WAY CLUTCH ENGAGEMENT

RETURN TIME { PRESENT EMBODIMENT / COMPARATIVE EXAMPLE }

——— : PRESENT EMBODIMENT
- - - - : COMPARATIVE EXAMPLE

DRIVE SYSTEM

TECHNICAL FIELD

The present invention relates to a drive system mounted on a vehicle, more particularly, to a drive system adapted to perform a coasting run.

BACKGROUND ART

Heretofore, there is known a coasting control apparatus (drive system) which is adapted to reduce fuel consumption by disconnecting a clutch and idling an engine when a vehicle is in a coasting run (for example, Patent Literature 1).

CITATION LIST

Patent Literature

Patent Literature 1: Japanese Patent Application Publication No. 2010-203544

SUMMARY OF INVENTION

Technical Problem

Also, in the drive system, instead of providing such a disconnectable clutch as in the above-mentioned Patent Literature 1, use of a one-way clutch has been considered.

The one-way clutch has advantages in that it is possible to prevent a drag due to a rotation of an engine without requiring a special control, an oil-hydraulic circuit and the like, thereby contributing to a simplification of the system and a reduction in cost.

More specifically, the supply of power can be cut off by arranging the one-way clutch in a power transmission circuit, changing a rotation speed of the engine and a transmission gear ratio (ratio) of the transmission, and thereby bringing a rotation speed on the input side of the one-way clutch into a state lower than a rotation speed on the output side thereof.

Hereinafter, the explanation is given of a shift from a coasting run (in which the clutch is in a power non-transmission state) to an usual run (in which the clutch is in a power transmission state).

In the coasting control apparatus (drive system) using a disconnectable clutch disclosed in Patent Literature 1, it is possible to forcibly increase the rotation speed of the engine by connecting the clutch.

Consequently, it is possible to smoothly perform the shift from the coasting run to the usual run (power transmission state).

On the contrary, in the drive system having a one-way clutch as the clutch, when shifting from the coasting run to the usual run, the one-way clutch is not brought into a power transmission state where the rotation speed on the input side of the one-way clutch does not become equal to or higher than the rotation speed on the output side thereof. More specifically, it is not possible to transmit the rotation speed on the foot axis side to the engine and to increase the rotation speed of the engine, thereby generating a time lag to the rise of foot axis torque and possibly deteriorating a merchantability of the vehicle equipped with the drive system having a one-way clutch.

It is therefore an object of the present invention to provide a drive system that enables a reduction in the rise time of foot axis torque even if the drive system has a one-way clutch.

Solution to Problem

In order to solve the above problem, the present invention provides a drive system including: a transmission provided at a downstream side of an internal combustion engine; a one-way clutch provided between the transmission and an output shaft; a calculation means that calculates a transmission gear ratio of the transmission based on a vehicle speed of a vehicle on which the drive system is mounted; a coasting determination means that determines whether to perform a coasting control or not, the coasting control bringing a transmission of power from the internal combustion engine to the output shaft into a non-transmission state; and a control means that controls an engine rotation speed of the internal combustion engine and the transmission gear ratio of the transmission, wherein when the coasting determination means determines to perform the coasting control, the control means executes the coasting control by reducing the engine rotation speed of the internal combustion engine or stopping the engine rotation to bring the one-way clutch into a non-transmission state, and changing the transmission gear ratio of the transmission to a transmission gear ratio smaller than the transmission gear ratio calculated by the calculation means.

According to the drive system thus configured, when the coasting determination means determines to perform the coasting control, the control means reduces the engine rotation speed of the internal combustion engine or stops the engine rotation to bring the one-way clutch into a non-transmission state, thereby making it possible to bring a transmission of power from the internal combustion engine to the output shaft into the non-transmission state.

Moreover, the control means changes the transmission gear ratio of the transmission to a transmission gear ratio smaller than the transmission gear ratio calculated by the calculation means, thereby making it possible to reduce an engine rotation speed at which the one-way clutch is brought into a transmission state, i.e., the engine rotation speed at which the power from the internal combustion engine to the output shaft is brought into the transmission state, when returning the coasting control to the usual control.

Consequently, even if the drive system has a one-way clutch, it is possible to reduce the rise time of foot axis torque, and thus even if the vehicle is equipped with the drive system having the one-way clutch, it is possible to prevent a drivability of the vehicle from being deteriorated.

Moreover, the above drive system is preferably configured so that when the coasting determination means determines to perform the coasting control, the control means starts to reduce the engine rotation speed of the internal combustion engine and then changes the transmission gear ratio of the transmission.

According to the drive system thus configured, the engine rotation speed of the internal combustion engine is first started to be reduced and thus the one-way clutch is brought into the non-transmission state. Consequently, it is possible to promptly bring the transmission of power from the internal combustion engine to the output shaft into a non-transmission state.

Moreover, the above drive system is preferably configured so that, when performing the coasting control, the control means changes the transmission gear ratio of the transmission within a range in which the one-way clutch is brought into the non-transmission state.

According to the drive system thus configured, it is possible to prevent the one-way clutch from being brought into a transmission state when performing the coasting control.

Moreover, the above drive system is preferably configured so that, when performing the coasting control, the control means changes the engine rotation speed of the internal combustion engine to a rotation speed according to the vehicle speed.

According to the drive system thus configured, it is possible to reduce a difference between the engine rotation speed when performing the coasting control, and an engine rotation speed at which the one-way clutch is brought into the transmission state when returning from the coasting control to the usual control, i.e., an engine rotation speed at which the power from the internal combustion engine to the output shaft is brought into a transmission state.

Consequently, even if the drive system has a one-way clutch, it is possible to reduce the rise time of foot axis torque, and thus even if the vehicle is equipped with the drive system having the one-way clutch, it is possible to prevent a drivability of the vehicle from being deteriorated.

Moreover, the above drive system is preferably configured so that the drive system further includes an engagement determination means that determines a transmission state or non-transmission state of the one-way clutch. When the coasting determination means determines not to perform the coasting control when performing the coasting control, and the engagement determination means determines that the one-way clutch is in the transmission state, the control means changes the transmission gear ratio of the transmission to the transmission gear ratio calculated by the calculation means.

According to the drive system thus configured, it is possible, for example, to employ the internal combustion engine within a range in which a brake specific fuel consumption becomes lower, thereby contributing to an improvement of a fuel efficiency.

Moreover, the above drive system is preferably configured so that the drive system further includes a swing conversion means including a rotation portion that is rotated by a rotation movement of a drive shaft connecting the internal combustion engine with the transmission, and a swing portion that performs a swing movement by a rotation of the rotation portion, the swing conversion means converting the rotation movement of the drive shaft into the swing movement; the one-way clutch that transmits a power in one way of the swing movement of the swing portion to the output shaft where the angular velocity of the swing portion performing the swing movement is equal to or higher than a rotation speed of the output shaft; and a rotation radius variable mechanism that can change an angular velocity of the swing portion by varying a rotation radius of the rotation portion.

According to the drive system thus configured, it is possible to convert the rotation movement of the drive shaft into the swing movement through the swing conversion means, and also to transmit the power in one way of the swing movement of the swing portion to the output shaft through the one-way clutch where the angular velocity of the swing portion is equal to or higher than the rotation speed of the output shaft. Moreover, it is possible to change the angular velocity of the swing portion by varying the rotation radius of the rotation portion through the rotation radius variable mechanism.

Advantageous Effects of Invention

According to the present invention, it is possible to provide a drive system that enables a reduction in the rise time of foot axis torque even if the drive system has a one-way clutch.

BRIEF DESCRIPTION OF DRAWINGS

FIGS. 4A to 4C are side views of the transmission and the one-way clutch according to the embodiment, where FIG. 4A illustrates a state in which the rotation radius r1 (eccentric amount) is maximum, FIG. 4B illustrates a state in which the rotation radius r1 is medium, and FIG. 4C illustrates a state in which the rotation radius r1 is zero.

FIG. 8 is a graph representing the relationship between the rotation angle θ1 of the input shaft and the angular velocity ω2 of the outer ring (swing portion).

FIGS. 12A to 12D are timing charts for comparing the drive system according to the embodiment with a drive system according to a comparative example.

DESCRIPTION OF EMBODIMENTS

Hereinafter, the mode for carrying out the present invention (hereinafter referred to as "embodiment") will be explained in detail with reference to the drawings when necessary. Note, the same reference sign is given to the common part in each of the drawings, and thus duplicate explanation thereof is omitted.

《Configuration of the Drive System》

Figure 1:
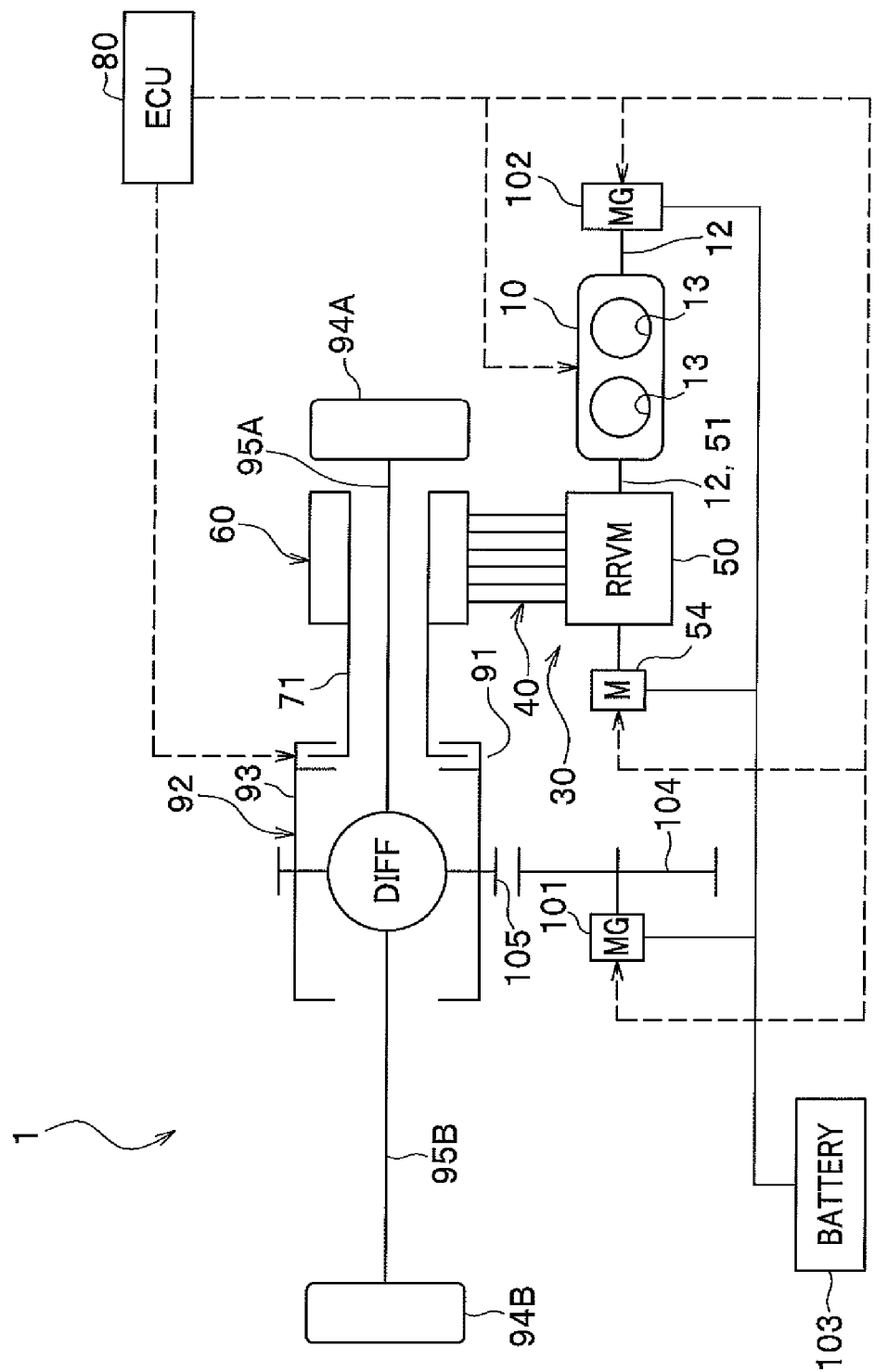
FIG. 1 is a configuration diagram of a drive system according to an embodiment of the invention.

FIG. 1 illustrates a drive system 1 according to the present embodiment, which is mounted on a vehicle (mobile object) not shown and is a system that generates a drive force of the vehicle.

The drive system 1 includes an internal combustion engine 10, a transmission 30, a one-way clutch device (see FIG. 2) including a plurality of (in this example, six) one-way clutches 60, an output shaft 71 that is rotated in a forward direction (one direction) with the vehicle when the vehicle is in a forward movement, and an ECU (Electronic Control Unit) 80 that electronically controls the system.

The "forward direction" is a direction corresponding to the forward direction of the vehicle, and the "reverse direction" is a direction corresponding to the backward direction of the vehicle.

〈Internal Combustion Engine〉

In the present embodiment, the internal combustion engine 10 is a reciprocating engine of in-line two-cylinder type having two cylinders 13, 13 in a cylinder block (not shown). Note the number of cylinders is not limited to two and thus may be appropriately changed.

The internal combustion engine 10 is adapted to combust fuel (gasoline) and to be operated in four cycles (admission, compression, combustion, exhaust) in accordance with the instruction from the ECU 80.

⟨Transmission⟩

Figure 2:
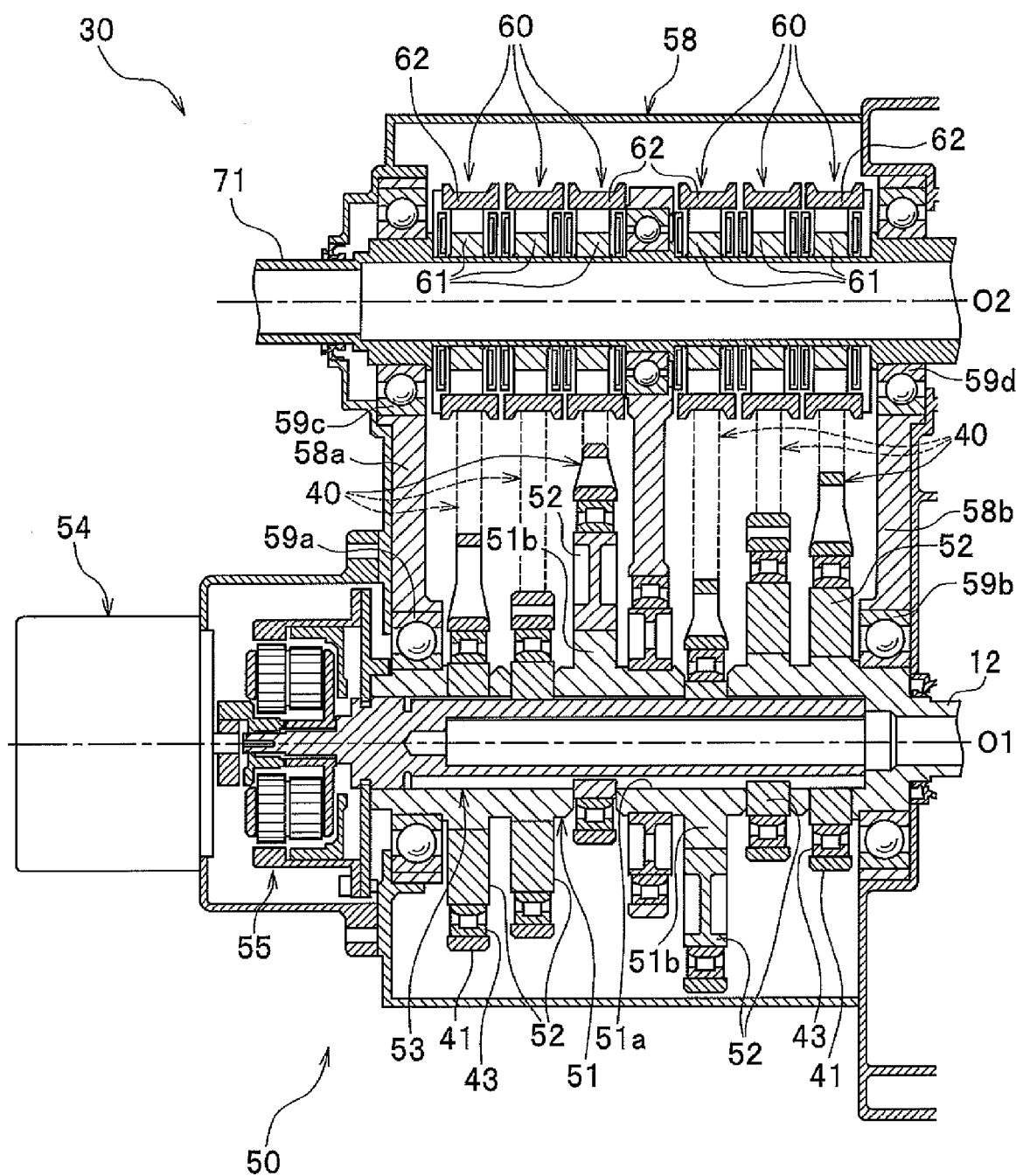
FIG. 2 is a cross-sectional view of a transmission and a one-way clutch according to the embodiment.

As illustrated in FIGS. 1 and 2, the transmission 30 is a mechanism that converts a rotation movement of a crankshaft 12 into a swing movement, transmits the swing movement to the one-way clutches 60, and can change an angular velocity $\omega 2$ (swing speed) and a swing angle $\theta 2$ (swing amplitude) of the swing movement (see FIG. 3) to thereby change a transmission gear ratio i infinitely and continuously.

Note "the transmission gear ratio i=the rotation speed of the input shaft 51/the rotation speed of the output shaft 71", where "the rotation speed of the output shaft 71" is "a rotation speed of the output shaft 71 in the case of being rotated by only a swing (power) in the forward direction of an outer ring 62".

Figure 3:
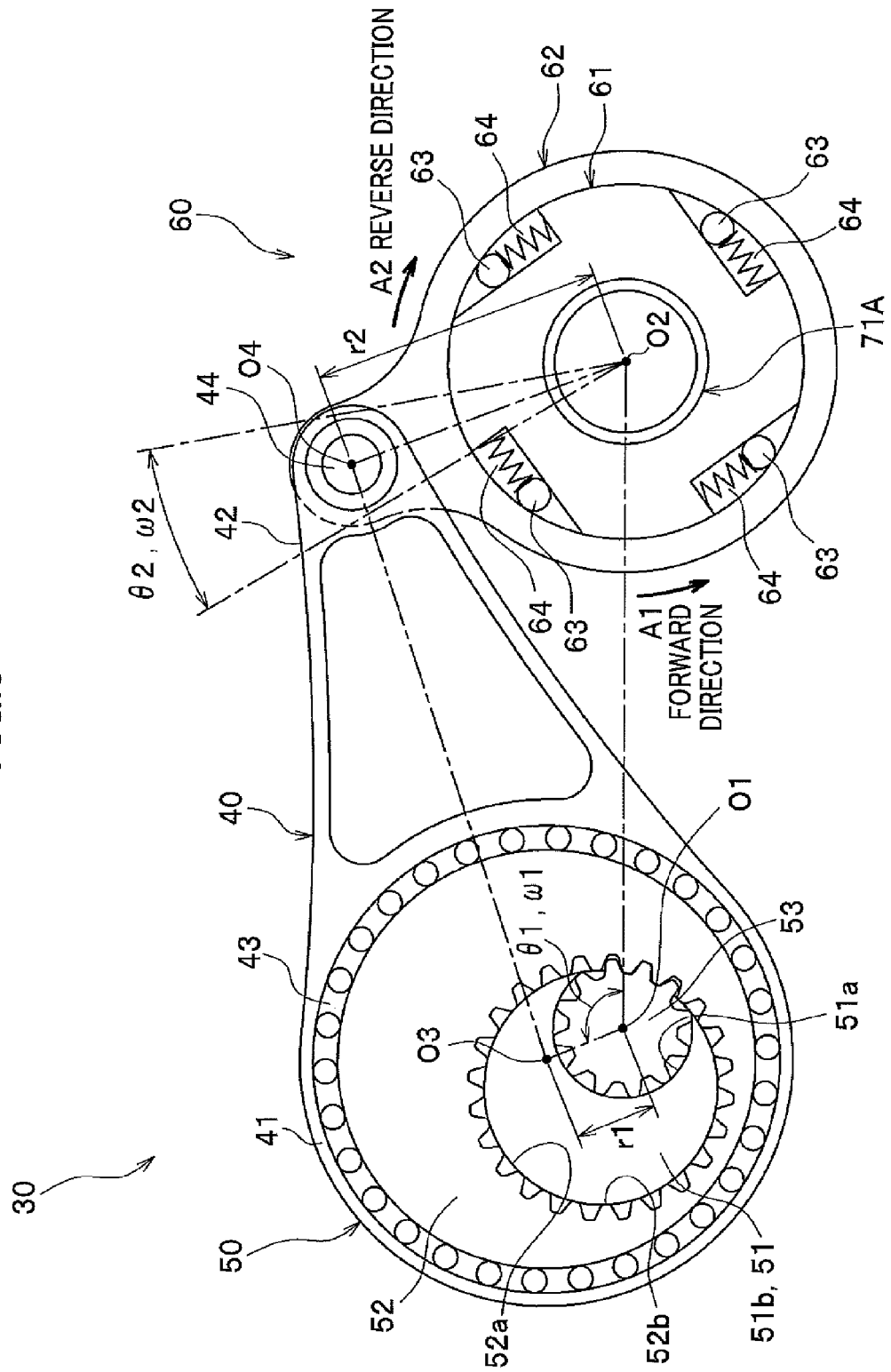
FIG. 3 is a side view of the transmission and the one-way clutch according to the embodiment.
Figure 5A:
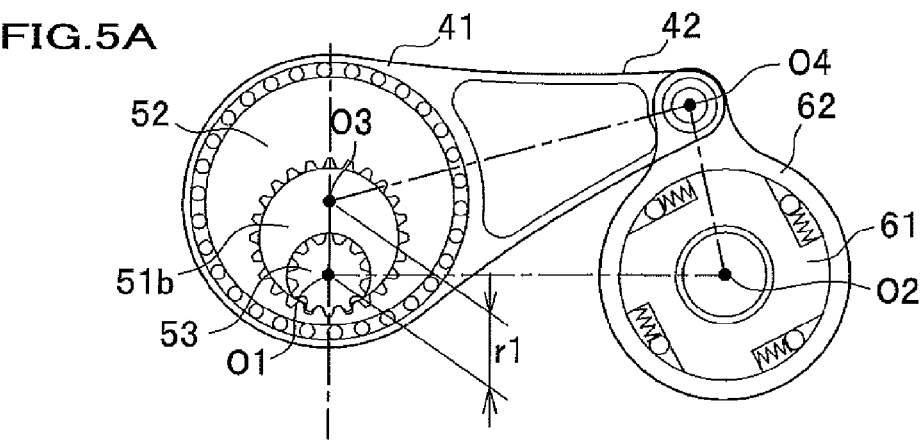
FIGS. 5A to 5D are side views of the transmission and the one-way clutch according to the embodiment, and illustrate a rotation movement and a swing movement in the state in which the rotation radius r1 is "maximum".
Figure 5B:
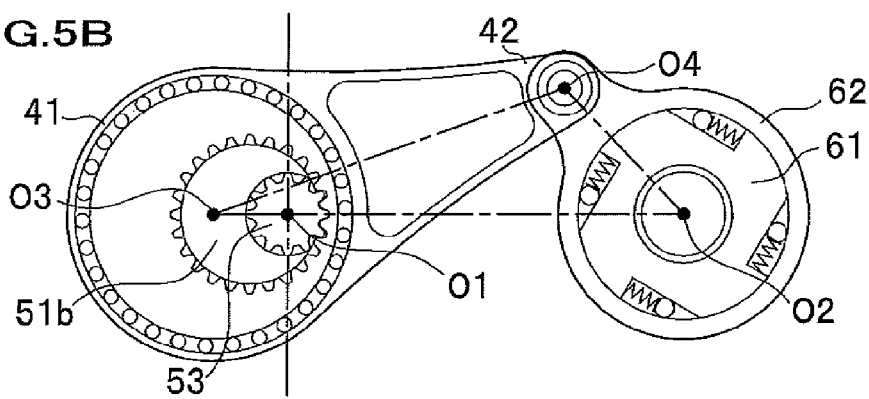
Figure 5C:
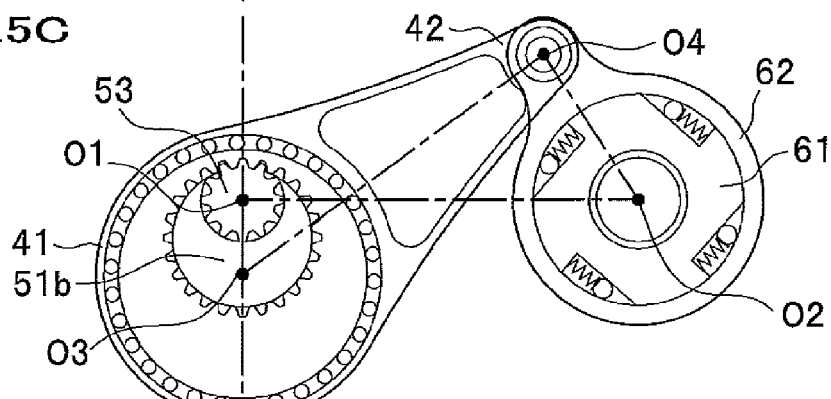
Figure 5D:
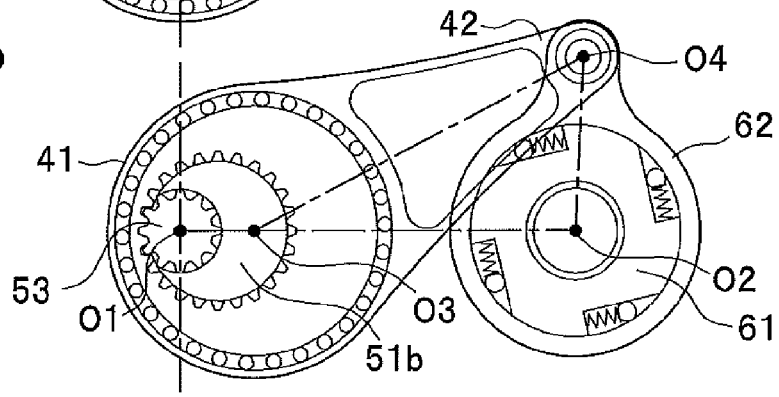
Figure 6A:
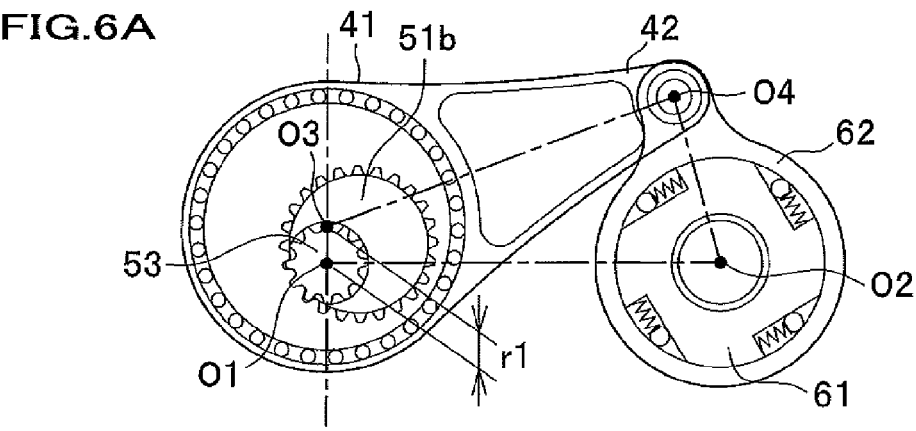
FIGS. 6A to 6D are side views of the transmission and the one-way clutch according to the embodiment, and illustrate a rotation movement and a swing movement in the state in which the rotation radius r1 is "medium".
Figure 6B:
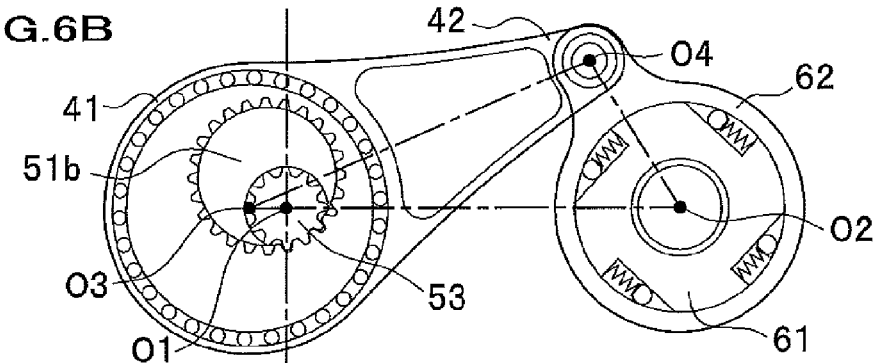
Figure 6C:
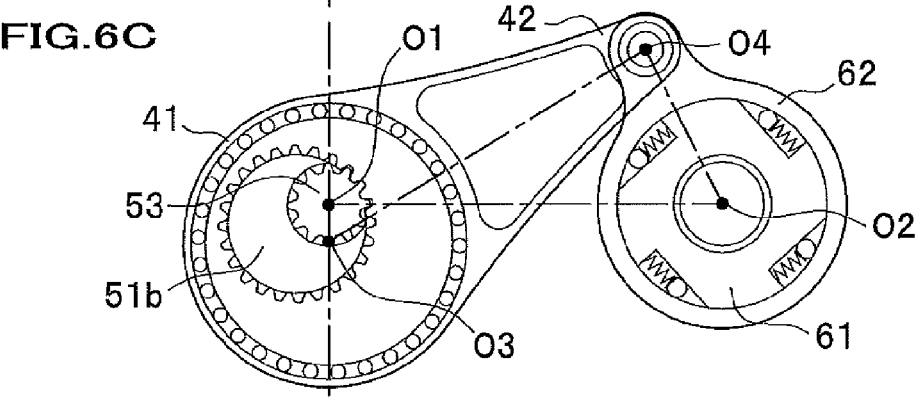
Figure 6D:
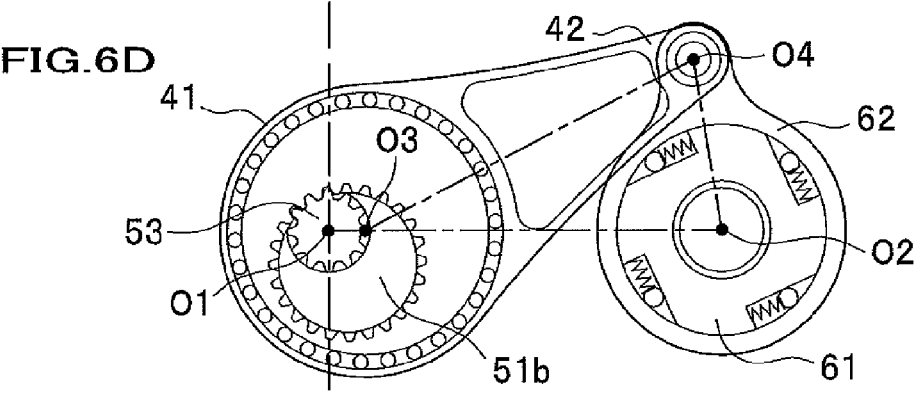
Figure 7A:
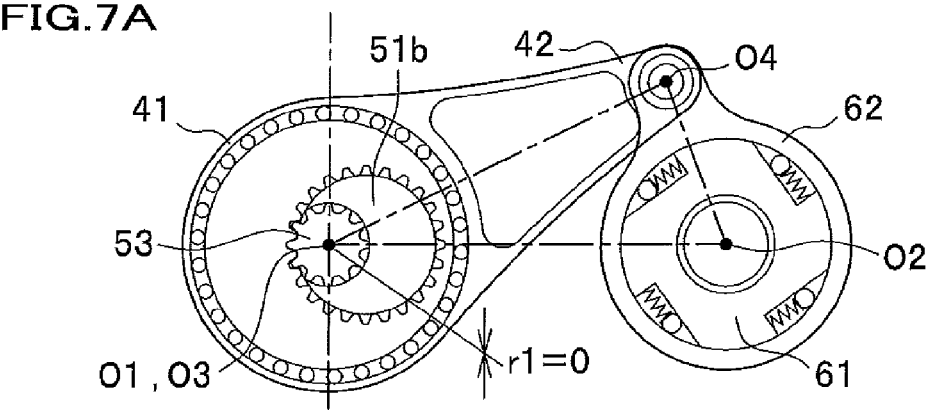
FIGS. 7A to 7D are side views of the transmission and the one-way clutch according to the embodiment, and illustrate a rotation movement and a swing movement in the state in which the rotation radius r1 is "zero".
Figure 7B:
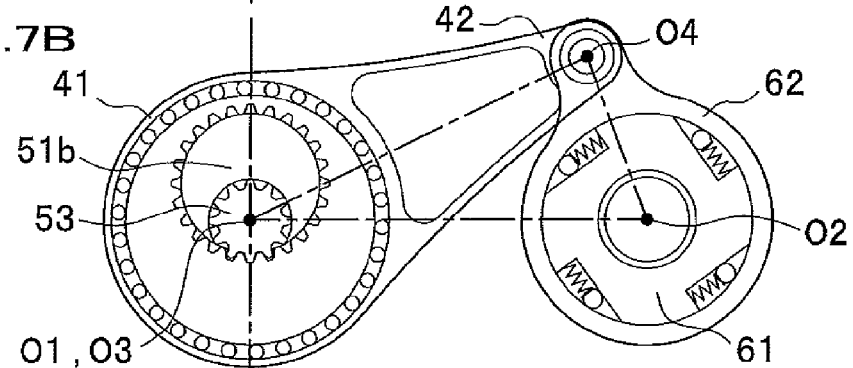
Figure 7C:
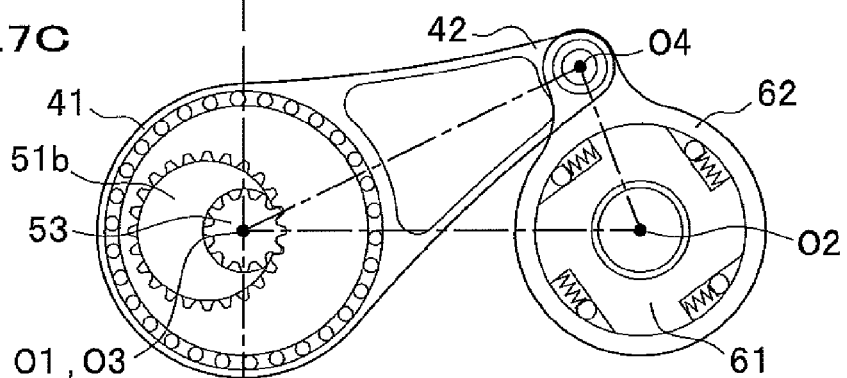
Figure 7D:
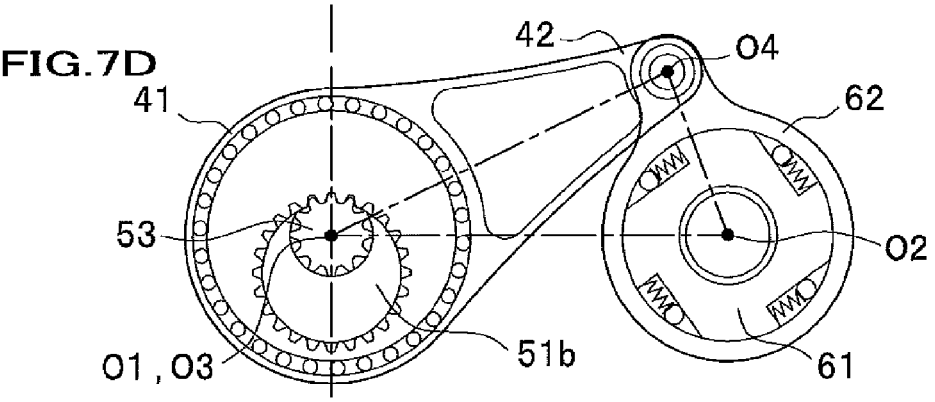

As illustrated in FIGS. 2 and 3, the transmission 30 includes six swing conversion rods 40 (swing conversion means) each converting the rotation movement of the crankshaft 12 into the swing movement, and a rotation radius variable mechanism 50 that can change the angular velocity $\omega 2$ (swing speed) and the swing angle $\theta 2$ (swing amplitude) of a swing portion 42 by changing, in a stepless manner, a rotation radius r1 of a rotary ring 41 (rotation portion) of each of the swing conversion rods 40 which are rotated by inputting the rotation movement of the crankshaft 12.

The rotation radius r1 is a distance between an input central axis line O1 and a first fulcrum O3 which is the center of a disk 52. Also, the swing center of the swing portion 42 is fixed on an output central axis line O2 of the output shaft 71, and a swing radius r2 (a distance between a second fulcrum O4 and the output central axis line O2) is also fixed.

Also, the respective numbers of the swing conversion rods 40, eccentric portions 51b, disks 52 and the like may be appropriately changed.

⟨Transmission—Rotation Radius Variable Mechanism⟩

As illustrated in FIGS. 2 and 3, the rotation radius variable mechanism 50 includes an input shaft 51 connected with the crankshaft 12 and having a power of the crankshaft 12 inputted thereto, six disks 52, a pinion 53 that rotates the input shaft 51 and the disks 52 relatively to each other to thereby vary the rotation radius r1 (eccentric radius, eccentric amount), a DC motor 54 that rotates the pinion 53, and a speed reduction mechanism 55.

The input shaft 51 is rotatably supported on a wall portion 58a and a wall portion 58b which constitute a transmission case 58, through a bearing 59a and a bearing 59b. Also, the input central axis line O1 of the input shaft 51 and the rotation axis line of the crankshaft 12 coincide with each other (see FIG. 2).

In FIG. 2, a right end side (one end side) of the input shaft 51 is connected to the crankshaft 12. Also, the input shaft 51 is adapted to be rotated with the crankshaft 12 at an angular velocity $\omega 1$ (see FIG. 3).

Moreover, the input shaft 51 has a hollow portion 51a into which the pinion 53 is rotatably inserted, on the input central axis line O1. Also, the hollow portion 51a is partially opened outwardly in a radial direction and the pinion 53 is adapted to be engaged with an inner gear 52b (see FIG. 3).

Furthermore, the input shaft 51 has six eccentric portions 51b each being off-centered with a constant eccentric distance relative to the input central axis line O1 and having an approximately crescent shape when viewed in the axial direction (see FIGS. 2 and 3). In the present embodiment, the six eccentric portions 51b are arranged at equal spaces in the axial direction of the input shaft 51 and arranged at equal angles (60 degrees) in the circumferential direction thereof.

By this configuration, the phases of the swing movements of six outer rings 62 of six one-way clutches 60 as described later are shifted at equal angles (60 degrees) (see FIG. 9). As a result, from the six outer rings 62 which perform the swing movements by the shift of the phases, the power in the forward direction of the swing movements of the six outer rings 62 is continuously transmitted to inner rings 61.

The six disks 52 are provided on the six eccentric portions 51b, respectively (see FIG. 2).

More specifically, as illustrated in FIG. 3, each of the disks 52 has a circular form. The disk 52 has a circular eccentric hole 52a formed at a position deviated from the first fulcrum O3 which is the center of the disk 52, and the eccentric portion 51b is rotatably accommodated in the eccentric hole 52a. Also, the inner gear 52b is formed on the inner circumferential surface of the eccentric hole 52a, and is engaged with the pinion 53.

The pinion 53 has (1) a function of locking the eccentric portion 51b and the disk 52 (keeping the relative position) to keep the rotation radius r1, and (2) a function of rotating the eccentric portion 51b and the disk 52 relatively to each other to vary the rotation radius r1.

When the pinion 53 is rotated synchronously with the eccentric portion 51b (the input shaft 51, the crankshaft 12), i.e., when the pinion 53 is rotated at the same rotation speed as that of the eccentric portion 51b (the input shaft 51, the crankshaft 12), the relative position of the eccentric portion 51b and the disk 52 is kept, i.e., the eccentric portion 51b and the disk 52 are adapted to be integrally rotated and thus the rotation radius r1 is kept.

On the other hand, when the pinion 53 is rotated at a rotation speed different from (exceeding/falling below) that of the eccentric portion 51b, the disk 52 engaged with the pinion 53 through the inner gear 52b is rotated relatively to and around the eccentric portion 51b, resulting in the rotation radius r1 which can be changed.

The DC motor 54 rotates in accordance with the instruction from the ECU 80 and to rotate the pinion 53 at an appropriate rotation speed. The DC motor 54 has an output shaft which is connected to the pinion 53 through the speed reduction mechanism 55 (planetary gear mechanism). The output of the DC motor 54 is reduced at a ratio of the order of 120:1 and then inputted to the pinion 53.

⟨Transmission—Swing Rod⟩

As illustrated in FIG. 3, the swing conversion rod 40 includes the rotary ring 41 to which the rotation movement of the input shaft 51 is inputted, the swing portion 42 which is integral with the rotary ring 41 and outputs the swing movement to the one-way clutch 60, and a bearing 43.

The rotary ring 41 is provided to be engaged with the outer circumferential surface of the disk 52 through the bearing 43. The swing portion 42 is rotatably connected with the outer ring 62 of the one-way clutch 60 through a pin 44.

By this configuration, the rotary ring 41 and the disk 52 are relatively rotatable. Accordingly, the rotary ring 41 is rotated synchronously with the disk 52 which is rotated with the rotation radius r1 with respect to the input central axis line O1 as the center, while the rotary ring 41 is rotated relatively to the disk 52. Therefore, the swing conversion rod 40 is not rotated as a whole and thus the swing conversion rod 40 substantially keeps maintaining its attitude.

Moreover, when the rotary ring 41 is rotated one revolution, the swing portion 42 performs a round-trip swing movement in an arc-like form and the outer ring 62 also performs a round-trip swing movement in an arc-like form, regardless of the magnitude of the rotation radius r1.

⟨One-way Clutch Device⟩

The one-way clutch device includes six one-way clutches 60 which are adapted to transmit only the power in the forward direction of the respective swing portions 42 in the six swing conversion rods 40 to the output shaft 71 on the right side.

As illustrated in FIG. 2, the output shaft 71 has a cylindrical shape and is rotatably supported on the wall portion 58a and the wall portion 58b which constitute the transmission case 58, through a bearing 59c and a bearing 59d, on the output central axis line O2 as the center.

Moreover, as illustrated in FIGS. 2 and 3, each of the one-way clutches 60 includes the inner ring 61 (inner portion of the clutch) which is integrally fixed on the outer circumferential surface of the output shaft 71 and is rotated with the output shaft 71, the outer ring 62 (outer portion of the clutch) provided to be engaged with the inner ring 61, a plurality of rollers 63 provided circumferentially between the inner ring 61 and the outer ring 62, and a plurality of coil springs 64 (spring-loading members) each spring-loading the corresponding roller 63.

The outer ring 62 is rotatably connected with the swing portion 42 of the swing conversion rod 40, and the outer ring 62 is adapted to perform the swing movement in the forward direction (see the arrow A1) and in the reverse direction (see the arrow A2) in conjunction with the swing movement of the swing portion 42.

The roller 63 is adapted to allow the inner ring 61 and the outer ring 62 to be brought into a locked state or a non-locked state each other, and each of the coil springs 64 spring-loads the corresponding roller 63 in a direction to be in the locked state.

Figure 9:
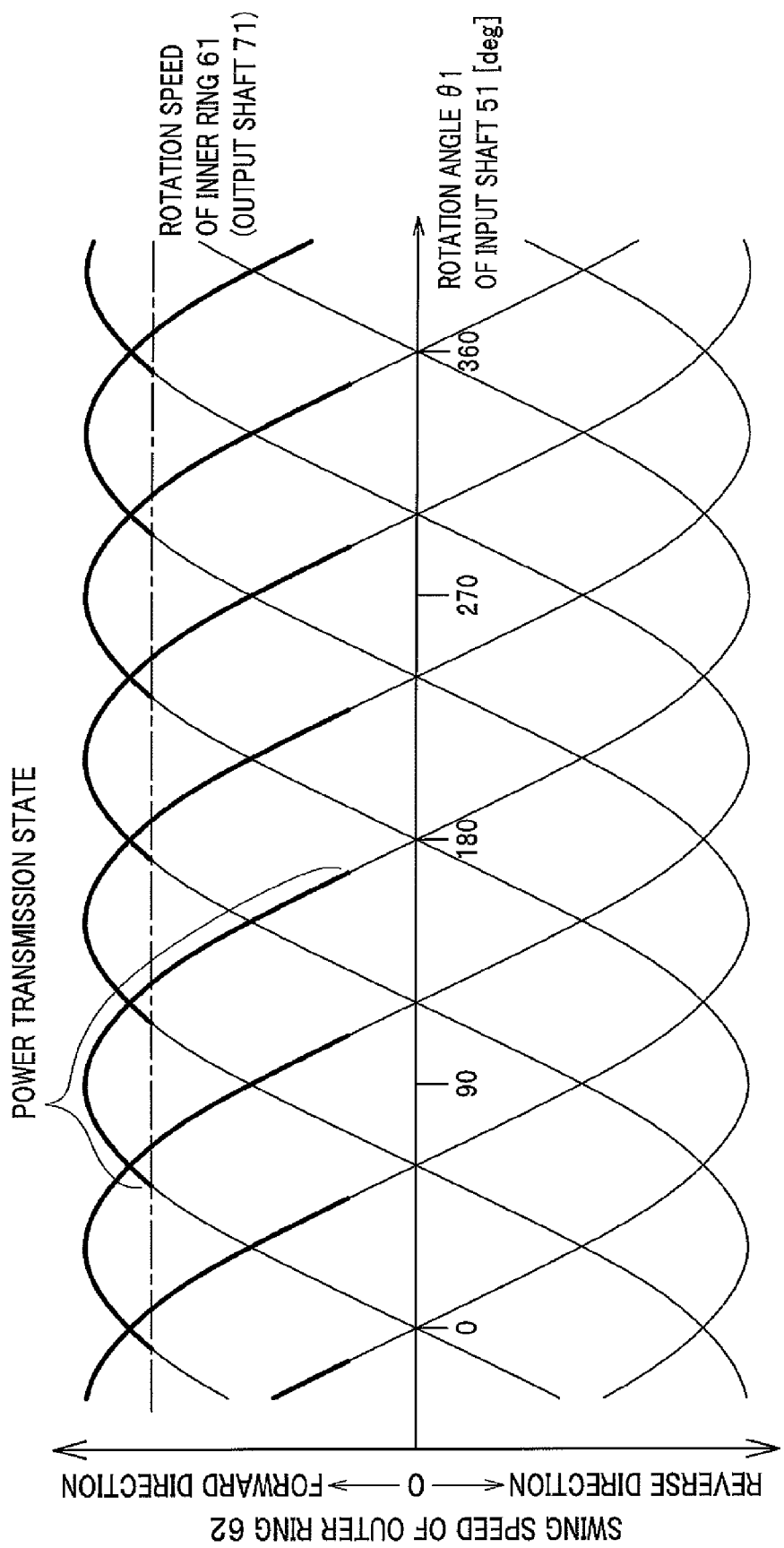
FIG. 9 is a graph representing the relationship between the rotation angle θ1 of the input shaft and the swing speed of the outer ring (swing portion).

As illustrated in FIG. 9, when the swing speed in the forward direction of the outer ring 62 exceeds the rotation speed in the forward direction of the inner ring 61 (the output shaft 71), the outer ring 62 and the output shaft 71 are brought into the locked state (power transmission state) through the roller 63. By this configuration, the power in the forward direction of the swing portion 42 which causes the swing movement in the swing conversion rod 40 is transmitted through the one-way clutch 60 to the output shaft 71, and thus the output shaft 71 is rotationally driven.

Note, FIG. 9 illustrates in heavy lines the state in which the power is transmitted from the outer ring 62 to the inner ring 61. Also, as illustrated in FIG. 9, even when the swing speed in the forward direction of the outer ring 62 becomes equal to or lower than the rotation speed in the forward direction of the inner ring 61, the power is transmitted from the outer ring 62 to the inner ring 61 by an elastic force of the roller 63 in a predetermined interval.

⟨Varied Status of the Rotation Radius r1⟩

First, the status in which the rotation radius r1 is varied is explained with reference to FIGS. 4A to 4C. Then, the rotation movement of the disk 52 (the rotary ring 41) in the rotation radius r1 being different, and the swing movement of the swing portion 42, are explained with reference to FIGS. 5A to 7D.

As illustrated in FIG. 4A, when the first fulcrum O3 (the center of the disk 52) and the input central axis line O1 are most remote from each other, the rotation radius r1 is brought into "maximum".

When the pinion 53 is rotated at a rotation speed different from that of the eccentric portion 51b and thus the disk 52 is rotated relatively to the eccentric portion 51b, the first fulcrum O3 and the input central axis line O1 come close to each other as illustrated in FIG. 4B, and thus the rotation radius r1 is brought into "medium".

Moreover, when the disk 52 is further rotated relatively to the eccentric portion Kb, the first fulcrum O3 and the input central axis line O1 overlap with each other as illustrated in FIG. 4C, and thus the rotation radius r1 is brought into "zero".

Thus, the rotation radius r1 can be controlled in a stepless manner between "maximum" and "zero".

Next, when the eccentric portion Kb is rotated synchronously with the pinion 53 in the state in which the rotation radius r1 illustrated in FIG. 4A is "maximum", the eccentric portion 51b, the disk 52 and the pinion 53 are adapted to be integrally rotated while keeping the rotation radius r1 at "maximum", as illustrated in FIGS. 5A to 5D.

In this case, the angular velocity ω2 and the swing angle θ2 of the swing portion 42 (the outer ring 62) become "maximum" (see FIG. 8).

Also, "the transmission gear ratio i=the rotation speed of the input shaft 51/the rotation speed of the output shaft 71", and "the swing speed of the outer ring 62=the radius (fixed value) of the outer ring 62×the angular velocity ω2", and accordingly the transmission gear ratio i becomes "small".

Next, when the eccentric portion 51b is rotated synchronously with the pinion 53 in the state in which the rotation radius r1 illustrated in FIG. 4B is "medium", the eccentric portion 51b, the disk 52 and the pinion 53 are adapted to be integrally rotated while keeping the rotation radius r1 at "medium", as illustrated in FIGS. 6A to 6D.

In this case, the angular velocity ω2 and the swing angle θ2 of the swing portion 42 (the outer ring 62) become "medium" (see FIG. 8), and the transmission gear ratio i becomes "medium".

Next, when the eccentric portion 51b is rotated synchronously with the pinion 53 in the state in which the rotation radius r1 illustrated in FIG. 4C is "zero", the eccentric portion 51b, the disk 52 and the pinion 53 are adapted to be integrally rotated while keeping the rotation radius r1 at "zero", as illustrated in FIGS. 7A to 7D. Namely, the eccentric portion 51b, the disk 52 and the pinion 53 are idly rotated within the rotary ring 41 and thus the swing conversion rod 40 is not operated.

In this case, the angular velocity ω2 and the swing angle θ2 of the swing portion 42 (the outer ring 62) become "zero" (see FIG. 8), and the transmission gear ratio i becomes "∞ (infinity)".

Thus in the state in which the rotation radius r1 is kept (in the state in which the eccentric portion 51b and the pinion 53 are rotated synchronously with each other), the rotation period of the input shaft 51 and the swing period of the swing portion 42 and the outer ring 62 are brought into synchronization with each other (except the case of the rotation radius r1=0), regardless of the magnitude of the rotation radius r1.

Namely, in the present embodiment, the swing conversion rod 40, the rotation radius variable mechanism 50 and the one-way clutch 60 constitute a four-node link mechanism which includes, as turning points, four nodes of the input central axis line O1, the output central axis line O2, the first fulcrum O3 and the second fulcrum O4.

Moreover, the second fulcrum O4 is configured to perform the swing movement with respect to the output central axis line O2 as the swing center, by the rotation movement of the first fulcrum O3 with respect to the input central axis line O1 as the center.

Also, the rotation radius variable mechanism 50 is capable of changing the angular velocity ω2 and the swing angle θ2 of the second fulcrum O4 by varying the rotation radius r1.

⟨Other Configuration⟩

Next, the explanation is given of the other configuration of the drive system 1.

⟨Other Configuration—Clutch, Differential Gear Mechanism⟩

The drive system 1 includes a clutch 91 and a differential gear mechanism 92.

More specifically, the output shaft 71 is connected through the clutch 91 which is controlled by the ECU 80, to a differential gear casing 93 (rotationally-driven member) constituting the differential gear mechanism 92.

The clutch 91 is adapted to transmit/cut off a power between the output shaft 71 and the differential gear casing 93.

The differential gear mechanism 92 includes side gears and pinion gears in the differential gear casing 93. The side gear on the right side is connected with a first drive shaft 95A integral with a drive wheel 94A on the right side, and the side gear on the left side is connected with a second drive shaft 95B integral with a drive wheel 94B on the left side. By this configuration, the first drive shaft 95A (the drive wheel 94A) and the second drive shaft 95B (the drive wheel 94B) are adapted to be differentially rotated through the differential gear mechanism 92.

Also, when the vehicle is in a forward movement, the clutch 91 is usually controlled to connect the output shaft 71 and the differential gear casing 93. Accordingly, when the vehicle is in the forward movement, the output shaft 71 is usually rotated in the forward direction (the direction in which the vehicle moves forward).

⟨Other Configuration—First and Second Motor-Generators, Battery⟩

The drive system 1 includes a first motor-generator 101, a second motor-generator 102, and a battery 103.

The battery 103 is, for example, of a lithium-ion type configured to be chargeable and dischargeable. The battery 103 is adapted to communicate an electric power between the first motor-generator 101 and the second motor-generator 102 and to supply the electric power to the DC motor 54.

The first motor-generator 101 has an output shaft to which a first gear 104 is secured, and the first gear 104 is engaged with a second gear 105 secured to the differential gear casing 93. By this configuration, an electric power is communicated between the first motor-generator 101 and the differential gear casing 93 and thus the first motor-generator 101 is adapted to function as a motor or as a generator.

More specifically, where the first motor-generator 101 functions as a motor, it uses the battery 103 as the power source. Where the first motor-generator 101 functions as a generator, the electric power generated by the first motor-generator 101 is charged in the battery 103.

The second motor-generator 102 has an output shaft which is connected with the crankshaft 12 of the internal combustion engine 10.

Where the second motor-generator 102 functions as a motor, i.e., where it functions as a motor using the battery 103 as the power source, for example, it assists in rotating the crankshaft 12, or functions as a starter for the internal combustion engine 10.

On the other hand, where the second motor-generator 102 functions as a generator, the electric power generated by the second motor-generator 102 is charged in the battery 103.

⟨ECU⟩

Figure 10:
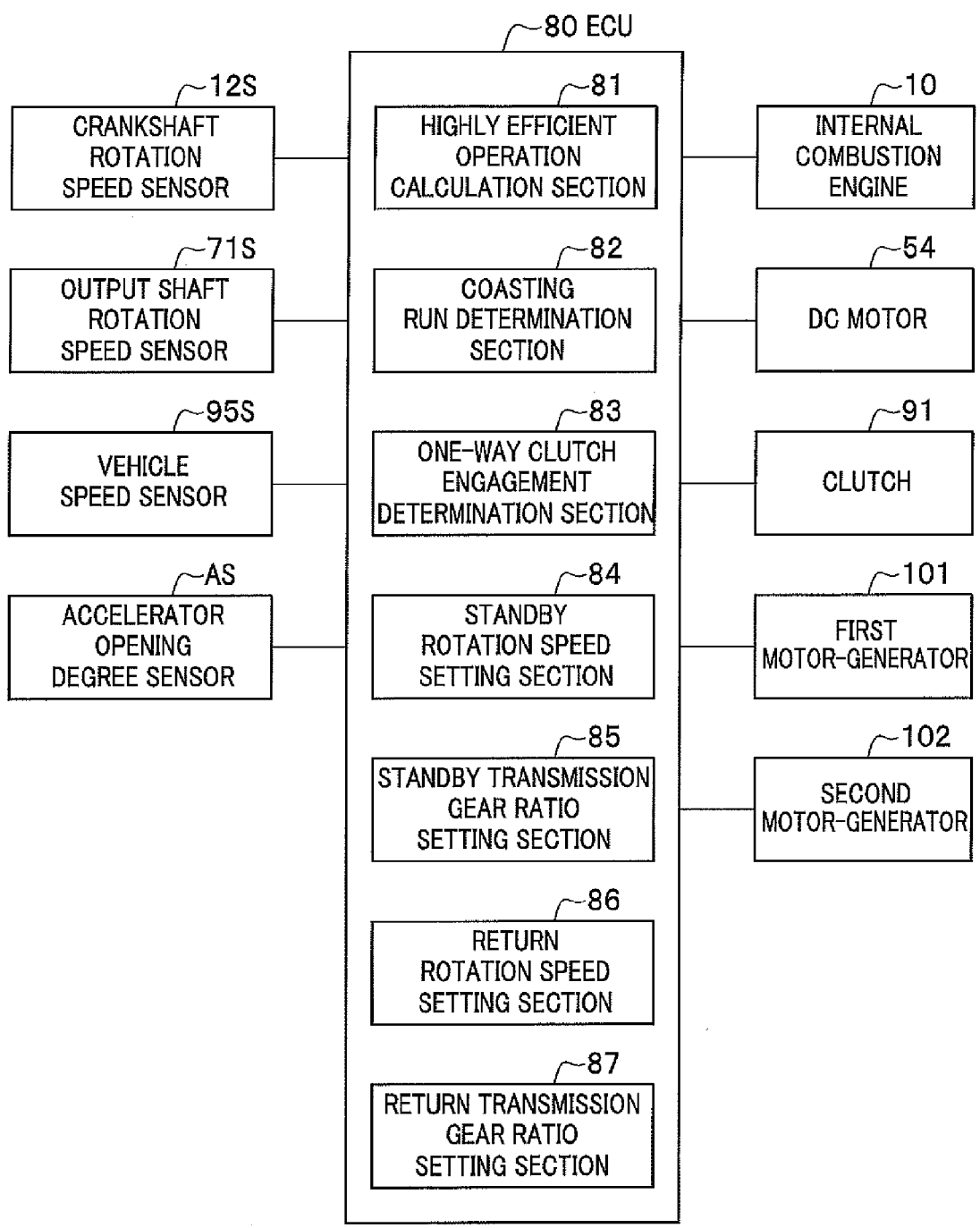
FIG. 10 is a functional block diagram of an electronic control unit according to the embodiment.

Next, the configuration of the ECU 80 in the drive system 1 will be explained with reference to FIG. 10.

The drive system 1 (see FIG. 1) includes a crankshaft rotation speed sensor 12S that detects a rotation speed of the crankshaft 12 (see FIG. 1), an output shaft rotation speed sensor 71S that detects a rotation speed of the output shaft 71 (see FIG. 1), a vehicle speed sensor 95S that detects a vehicle speed of the vehicle equipped with the drive system 1 by detecting a rotation speed of the first drive shaft 95A or the second drive shaft 95B (see FIG. 1), and an accelerator opening degree sensor AS that detects an opening degree of the accelerator (not shown). Detection signals from the sensors are inputted to the ECU 80.

The ECU 80 is adapted to control the internal combustion engine 10 so as to control the rotation speed generated by the internal combustion engine 10, i.e., the rotation speed of the crankshaft 12.

Also, the ECU 80 is adapted to control the DC motor 54 so as to control the transmission gear ratio i (ratio) of the transmission 30.

Furthermore, the ECU 80 is adapted to control a connection/disconnection of the clutch 91, and a drive/regeneration of the first motor-generator 101 and the second motor-generator 102.

Moreover, the ECU 80 includes a highly efficient operation calculation section 81, a coasting run determination section 82, a one-way clutch engagement determination section 83, a standby rotation speed setting section 84, a standby transmission gear ratio setting section 85, a return rotation speed setting section 86, and a return transmission gear ratio setting section 87.

The highly efficient operation calculation section 81 is adapted, based on the map of brake specific fuel consumption (BSFC) of the internal combustion engine 10, to calculate a transmission gear ratio $i_{BSFC}$ of the transmission 30 such that the internal combustion engine 10 generates a rotation speed $\omega_{BSFC}$ at which the brake specific fuel consumption becomes lower, with respect to an engine output required.

The coasting run determination section 82 is adapted to determine whether or not the vehicle (not shown) equipped with the drive system 1 is capable of performing the coasting run, based on the vehicle speed detected by the vehicle speed sensor 95S, and the accelerator opening degree detected by the accelerator opening degree sensor AS.

The one-way clutch engagement determination section 83 is adapted to determine whether the one-way clutch 60 is in a locked state (power transmission state) or a non-locked state (power non-transmission state).

More specifically, based on the rotation speed $\omega_{12}$ of the crankshaft 12 detected by the crankshaft rotation speed sensor 12S, the rotation speed $\omega_{71}$ of the output shaft 71 detected by the output shaft rotation speed sensor 71S, and the transmission gear ratio of the transmission 30, the one-way clutch engagement determination section 83 determines that the one-way clutch 60 is in the non-locked state in the case of $\omega_{71} > \omega_{12} \times i$, and determines that the one-way clutch 60 is in the locked (engaged) state in the case of $\omega_{71} = \omega_{12} \times i$.

The standby rotation speed setting section 84 is capable of setting the rotation speed of the internal combustion engine 10 (the crankshaft 12) when the vehicle is in the coasting run.

The standby transmission gear ratio setting section 85 is capable of setting the transmission gear ratio of the transmission 30 when the vehicle is in the coasting run.

The return rotation speed setting section 86 is capable of setting the rotation speed of the internal combustion engine 10 (the crankshaft 12) when the vehicle is returned from the coasting run to the usual run.

The return transmission gear ratio setting section 87 is capable of setting the transmission gear ratio of the transmission 30 when the vehicle is returned from the coasting run to the usual run.

⟨Coasting Run Processing Executed by the ECU in the Drive System⟩

Figure 11:
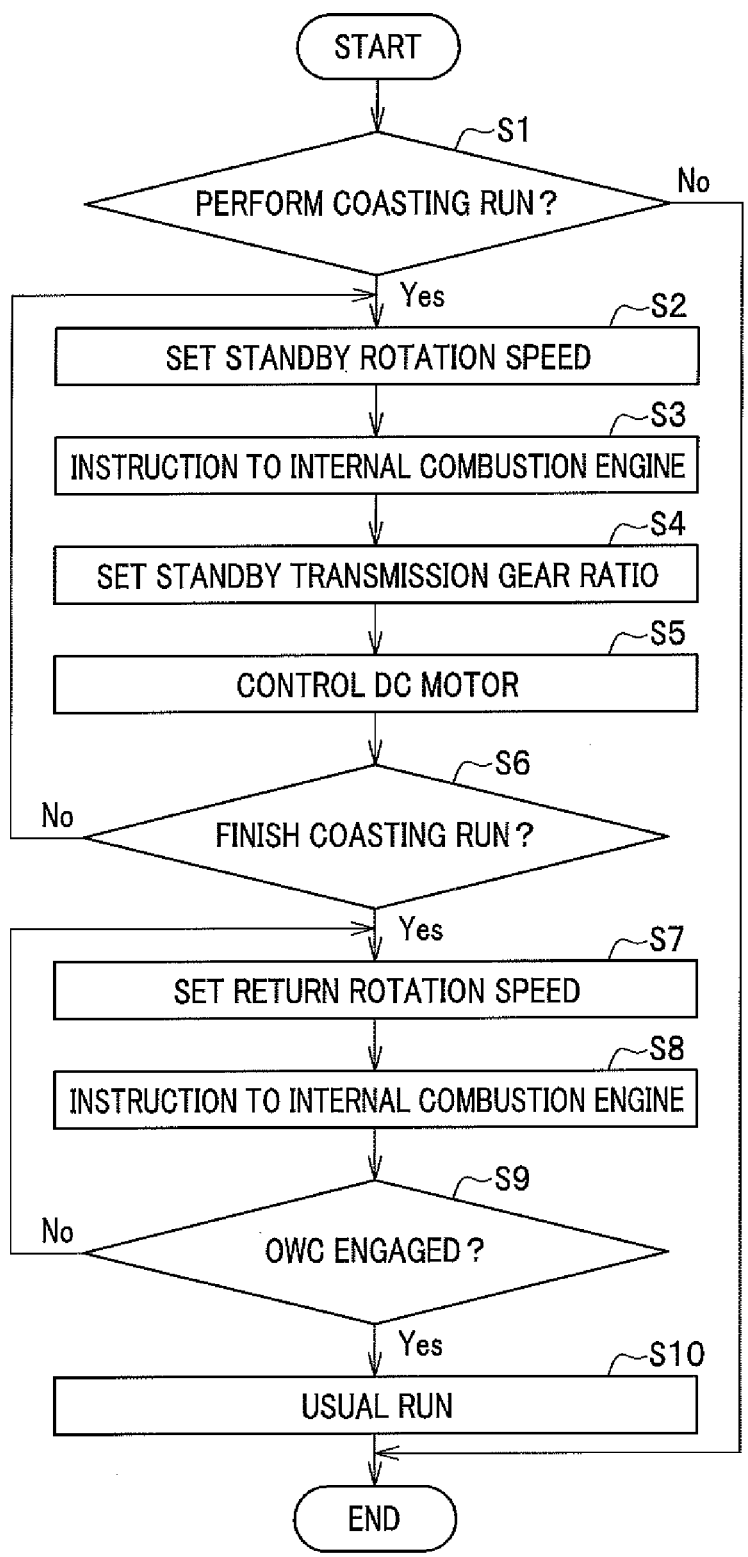
FIG. 11 is a flowchart for explaining a coasting run processing in the drive system according to the embodiment.

Next, the coasting run processing executed by the ECU 80 in the drive system 1 is explained with reference to FIG. 11.

In step S1, the coasting run determination section 82 of the ECU 80 determines whether to perform the coasting run or not.

For example, where the vehicle speed detected by the vehicle speed sensor 95S is equal to or higher than a predetermined value, and the accelerator opening degree detected by the accelerator opening degree sensor AS is below a predetermined value, the coasting run determination section 82 determines to perform the coasting run.

Where the coasting run determination section 82 determines to perform the coasting run (S1, Yes), the processing by the ECU 80 proceeds to step S2. On the other hand, where the coasting run determination section 82 determines not to perform the coasting run (S1, No), the ECU 80 performs the usual run.

In step S2, the standby rotation speed setting section 84 of the ECU 80 sets a standby rotation speed which is the rotation speed of the internal combustion engine 10 (the crankshaft 12) when the vehicle is in the coasting run.

Meanwhile, the highly efficient operation calculation section 81 calculates the rotation speed $\omega_{BSFC}$ of the internal combustion engine 10 (the crankshaft 12) and the transmission gear ratio $i_{BSFC}$ of the transmission 30, which correspond to a current vehicle speed detected by the vehicle speed sensor 95S.

The standby rotation speed setting section 84 sets, as the standby rotation speed, a rotation speed lower than the rotation speed $\omega_{BSFC}$ of the internal combustion engine 10 (the crankshaft 12) calculated by the highly efficient operation calculation section 81.

Note, in the timing charts using FIGS. 12A to 12D as stated later, the explanation is given on the assumption that the standby rotation speed is set to a predetermined rotation speed (fixed value) during an idling.

In step S3, the ECU 80 controls the internal combustion engine 10 so that the rotation speed of the internal combustion engine 10 (the crankshaft 12) is brought into the standby rotation speed set in step S2.

In step S4, the standby transmission gear ratio setting section 85 of the ECU 80 sets a standby transmission gear ratio which is the transmission gear ratio of the transmission 30 when the vehicle is in the coasting run.

Meanwhile, the highly efficient operation calculation section 81 calculates the rotation speed $\omega_{BSFC}$ of the internal combustion engine 10 (the crankshaft 12) and the transmission gear ratio $i_{BSFC}$ of the transmission 30, which correspond to a current vehicle speed detected by the vehicle speed sensor 95S.

The standby transmission gear ratio setting section 85 sets, as the standby transmission gear ratio, a transmission gear ratio (a transmission gear ratio in the overdrive side) smaller than the transmission gear ratio $i_{BSFC}$ of the transmission 30 calculated by the highly efficient operation calculation section 81 and greater than the transmission gear ratio $i_{en}$ at which the one-way clutch 60 is brought into the locked state (power transmission state) so that the one-way clutch 60 is brought into the non-locked state (power non-transmission state). The transmission gear ratio $i_{en}$ is a transmission gear ratio such that "the standby rotation speed of the crankshaft 12×the transmission gear ratio $i_{en}$=the rotation speed of the output shaft 71 based on a current vehicle speed". Namely, the standby transmission gear ratio is set in the range greater than the transmission gear ratio $i_{en}$ and smaller than the transmission gear ratio $i_{BSFC}$.

Note, in the timing charts using FIGS. 12A to 12D as stated later, the explanation is given on the assumption that the standby transmission gear ratio is set to a value smaller by a predetermined value than the transmission gear ratio $i_{BSFC}$ of the transmission 30 calculated by the highly efficient operation calculation section 81.

In step S5, the ECU 80 controls the DC motor 54 so that the transmission gear ratio of the transmission 30 is brought into the standby transmission gear ratio set in step S4.

In step S6, the coasting run determination section 82 of the ECU 80 determines whether to finish the coasting run or not.

For example, where the vehicle speed detected by the vehicle speed sensor 95S is below the predetermined value, or where the accelerator opening degree detected by the accelerator opening degree sensor AS is equal to or higher than the predetermined value, the coasting run determination section 82 determines to finish the coasting run.

Where the coasting run determination section 82 determines to finish the coasting run (S6, Yes), the processing by the ECU 80 proceeds to step S7. On the other hand, where the coasting run determination section 82 determines not to finish the coasting run (S6, No), the processing by the ECU 80 returns to step S2, and the processings of step S2 to step S6 are repeated until the coasting run determination section 82 determines to finish the coasting run.

In step S7, the return rotation speed setting section 86 of the ECU 80 sets, as the return rotation speed, a rotation speed of the internal combustion engine 10 (the crankshaft 12) at which the one-way clutch 60 is brought into the locked state (power transmission state), based on a current rotation speed of the output shaft 71 detected by the output shaft rotation speed sensor 71S, and the transmission gear ratio of the transmission 30.

In step S8, the ECU 80 controls the internal combustion engine 10 so that the rotation speed of the internal combustion engine 10 (the crankshaft 12) is equal to the return rotation speed set in step S7.

Moreover, in step S7 and step S8, the return transmission gear ratio setting section 87 of the ECU 80 sets, as the return transmission gear ratio, a transmission gear ratio obtained when the coasting run determination section 82 determines to finish the coasting run (S6, Yes), and maintains the transmission gear ratio of the transmission 30.

In step S9, the one-way clutch engagement determination section 83 of the ECU 80 determines whether or not the one-way clutch 60 is in the locked state (power transmission state).

For example, based on the rotation speed $\omega_{12}$ of the crankshaft 12 (see FIG. 1) detected by the crankshaft rotation speed sensor 12S, the rotation speed $\omega_{71}$ of the output shaft 71 (see FIG. 1) detected by the output shaft rotation speed sensor 71S, and the transmission gear ratio i of the transmission 30 (see FIG. 1), the one-way clutch engagement determination section 83 determines that the one-way clutch 60 is in the non-locked state in the case of $\omega_{71}>\omega_{12}\times i$, and determines that the one-way clutch 60 is in the locked state (power transmission state) in the case of $\omega_{71}=\omega_{12}\times i$.

Alternatively, the one-way clutch engagement determination section 83 may determine that the one-way clutch 60 is in the locked state (power transmission state) where the rotation speed $\omega_{12}$ of the crankshaft 12 (see FIG. 1) detected by the crankshaft rotation speed sensor 12S becomes equal to or higher than the return rotation speed set in step S7.

Where the one-way clutch engagement determination section 83 determines that the one-way clutch 60 is in the locked state (power transmission state) (S9, Yes), the processing by the ECU 80 proceeds to step S10. On the other hand, where the one-way clutch engagement determination section 83 determines that the one-way clutch 60 is not in the locked state (power transmission state) (S9, No), the processing by the ECU 80 returns to step S7, and the processings of step S7 to step S9 are repeated until the one-way clutch engagement determination section 83 determines that the one-way clutch 60 is in the locked state (power transmission state).

In step S10, the ECU 80 controls the usual run.

More specifically, the ECU 80 controls the internal combustion engine 10 and the DC motor 54 based on the rotation speed $\omega_{BSFC}$ of the internal combustion engine 10 at which the brake specific fuel consumption becomes lower, and the transmission gear ratio $i_{BSFC}$ of the transmission 30, which are calculated by the highly efficient operation calculation section 81. Thereafter, the coasting run processing executed by the ECU 80 comes to an end.

⟨Operation and Advantageous Effects of the Drive System According to the Present Embodiment⟩

The operation and advantageous effects of the drive system 1 according to the present embodiment are hereinafter explained using the timing chars shown in FIGS. 12A to 12D, by comparing the coasting control by the drive system 1 according to the present embodiment with the coasting control according to a comparative example.

Note, the present embodiment and the comparative example have a similar configuration except for a difference in the control in the coasting run, and thus the explanation of the drive system according to the comparative example is omitted.

FIG. 12A shows the vehicle speed, FIG. 12B shows the rotation speed of the crankshaft 12, FIG. 12C shows the transmission gear ratio of the transmission 30, and FIG. 12D shows the engagement of the one-way clutch 60 (ON: power transmission state, OFF: power non-transmission state).

The drive system 1 according to the present embodiment is represented by a solid line, and a drive system according to the comparative example is represented by a broken line. Also, $\omega_{var}$ shown in FIG. 12B represents a control of the rotation speed of the crankshaft 12 according to a modification as stated later.

Moreover, FIG. 12B shows by a two-dot chain line, the rotation speed $\omega_{BSFC}$ of the internal combustion engine 10 (the crankshaft 12) which is calculated by the highly efficient operation calculation section 81 and corresponds to a current vehicle speed detected by the vehicle speed sensor 95S.

Also, FIG. 12C shows by a two-dot chain line, the transmission gear ratio $i_{BSFC}$ of the transmission 30 which is calculated by the highly efficient operation calculation section 81 and corresponds to a current vehicle speed detected by the vehicle speed sensor 95S.

First, the explanation is given of the drive system 1 according to the present embodiment.

When the ECU 80 starts the coasting run (S1, Yes) at time T1, the ECU 80 first controls the internal combustion engine 10 (the crankshaft 12) to reduce the rotation speed (S2, S3) and then brings the one-way clutch 60 into OFF (power non-transmission state).

During the period from time T1 to time T2, the ECU 80 controls the internal combustion engine 10 so that the rotation speed of the crankshaft 12 is reduced to the standby rotation speed and the transmission gear ratio of the transmission 30 is reduced to the standby transmission gear ratio (S2 to S5).

When the ECU 80 determines at time T2, to finish the coasting run (S6, Yes), the ECU 80 controls the internal combustion engine 10 so that the rotation speed of the crankshaft 12 is equal to the return rotation speed (S7, S8).

Then at time T3, the one-way clutch 60 is brought into ON (power transmission state) (S9, Yes).

Next, the explanation is given of the drive system according to the comparative example.

When the ECU 80 starts the coasting run at time T1, the ECU 80 controls the internal combustion engine 10 (the crankshaft 12) to reduce the rotation speed and/or to increase the transmission gear ratio of the transmission 30, and then brings the one-way clutch 60 into OFF (power non-transmission state).

During the period from time T1 to time T2, the ECU 80 controls the internal combustion engine 10 so that the rotation speed of the crankshaft 12 is reduced to the standby rotation speed and the transmission gear ratio of the transmission 30 is brought into infinity (∞). By bringing the transmission gear ratio into ∞, the transmission of drive power from the crankshaft 12 to the output shaft 71 is cut off.

When the ECU 80 determines at time T2, to finish the coasting run, the ECU 80 controls the internal combustion engine 10 so that the rotation speed of the crankshaft 12 is increased and the and the transmission gear ratio of the transmission 30 is reduced.

Then at time T4, the one-way clutch 60 is brought into ON (power transmission state).

The return time, which is required from the determination to finish the coasting run until the one-way clutch 60 is brought into ON (power transmission state) and thus the power from the internal combustion engine 10 (the crankshaft 12) is transmitted to the output shaft 71, is the period from time T2 to time T4 in the comparative example, while in the present embodiment, the return time is reduced to the period from time T2 to time T3.

It is not possible for the drive system 1 having the one-way clutch 60 to transmit a power from the drive wheels 94A, 94B to the crankshaft 12. For this reason, it is desired to increase the rotation speed of the crankshaft 12 and thus to reduce the return time required until the one-way clutch 60 is brought into ON (power transmission state).

As illustrated in contrast with the comparative example, according to the drive system 1 of the present embodiment, it is possible to reduce the rotation speed of the internal combustion engine 10 (the crankshaft 12) enough to bring the one-way clutch 60 into ON (power transmission state) by reducing the transmission gear ratio of the transmission 30 (by setting the transmission gear ratio in the overdrive side) during the coasting run. Accordingly, even if the drive system 1 has the one-way clutch 60, it is possible to reduce the return time and thus to provide the drive system 1 with an improved merchantability.

Moreover, the drive system 1 according to the present embodiment is configured to reduce the transmission gear ratio of the transmission 30 (S4, S5) after reducing the rotation speed of the internal combustion engine 10 (the crankshaft 12) (S2, S3), i.e., to reduce the transmission gear ratio of the transmission 30 after the one-way clutch 60 is brought into the non-locked state (power non-transmission state), thereby making it possible to promptly perform the shift to the coasting run.

⟨Modifications⟩

In step S2, the explanation is given of the configuration in which the standby rotation speed set by the standby rotation speed setting section 84 is set to the predetermined rotation speed (fixed value), but the embodiment is not limited to the configuration.

For example, such a configuration may be adopted that the highly efficient operation calculation section 81 calculates the rotation speed $\omega_{BSFC}$ of the internal combustion engine 10 (the crankshaft 12) and the transmission gear ratio $i_{BSFC}$ of the transmission 30, which correspond to a vehicle speed detected by the vehicle speed sensor 95S, and that a value smaller by a predetermined value than the rotation speed $\omega_{BSFC}$ of the internal combustion engine 10 (the crankshaft 12) calculated by the highly efficient operation calculation section 81 is set as the standby rotation speed (see $\omega_{var}$ shown in FIG. 12B).

By this configuration, it is possible to prevent the one-way clutch 60 from being brought into the engaged state while the coasting run is performed, and also to reduce the return time (the time required from the determination to finish the coasting run until the one-way clutch 60 is brought into the engaged state) when the coasting run is finished.

Moreover, such a configuration may be adopted that the internal combustion engine 10 is stopped while the coasting run is performed. Namely, such a configuration as to set the standby rotation speed to zero may be adopted. Stopping the internal combustion engine 10 makes it possible to improve fuel consumption.

In step S7 and step S8, the explanation is given of the configuration in which the return transmission gear ratio setting section 87 of the ECU 80 sets, as the return transmission gear ratio, a transmission gear ratio obtained when the coasting run determination section 82 determines that the coasting run is finished (S6, Yes), and maintains the transmission gear ratio of the transmission 30, but the embodiment is not limited to the configuration.

For example, such a configuration may be adopted that the return transmission gear ratio setting section 87 sets, as the return transmission gear ratio, a value smaller by a predetermined value than the transmission gear ratio $i_{BSFC}$ of the transmission 30 calculated by the highly efficient operation calculation section 81, and the ECU 80 controls the DC motor 54 so that the transmission gear ratio of the transmission 30 is equal to the return transmission gear ratio set by the return transmission gear ratio setting section 87.

By this configuration, it is possible to reduce the return time.

REFERENCE SIGNS LIST

1: Drive System
10: Internal Combustion Engine
12: Crankshaft
30: Transmission
50: Rotation Radius Variable Mechanism
54: DC Motor
60: One-way Clutch
71: Output Shaft
80: ECU (Control Means)
81: Highly Efficient Operation Calculation Section (Calculation Means)
82: Coasting Run Determination Section (Coasting Determination Means)
83: One-way Clutch Engagement Determination Section (Engagement Determination Means)
84: Standby Rotation Speed Setting Section (Control Means)
85: Standby Transmission Gear Ratio Setting Section (Control Means)
86: Return Rotation Speed Setting Section (Control Means)
87: Return Transmission Gear Ratio Setting Section (Control Means)
12S: Crankshaft Rotation Speed Sensor
71S: Output Shaft Rotation Speed Sensor
95S: Vehicle Speed Sensor
AS: Accelerator Opening Degree Sensor

The invention claimed is:

1. A drive system comprising:
a transmission provided at a downstream side of an internal combustion engine;
a one-way clutch provided between the transmission and an output shaft;
a calculation means that calculates a transmission gear ratio of the transmission based on a vehicle speed of a vehicle on which the drive system is mounted;
a coasting determination means that determines whether to perform a coasting control or not, the coasting control bringing a transmission of power from the internal combustion engine to the output shaft into a non-transmission state; and
a control means that controls an engine rotation speed of the internal combustion engine and the transmission gear ratio of the transmission, wherein
when the coasting determination means determines to perform the coasting control, the control means executes the coasting control by reducing the engine rotation speed of the internal combustion engine or stopping the engine rotation to bring the one-way clutch into a non-transmission state, and changing the transmission gear ratio of the transmission to a transmission gear ratio smaller than the transmission gear ratio calculated by the calculation means.

2. The drive system according to claim 1, wherein when the coasting determination means determines to perform the coasting control, the control means starts to reduce the engine rotation speed of the internal combustion engine and then changes the transmission gear ratio of the transmission.

3. The drive system according to claim 1, wherein when performing the coasting control, the control means changes the transmission gear ratio of the transmission within a range in which the one-way clutch is brought into the non-transmission state.

4. The drive system according to claim 2, wherein when performing the coasting control, the control means changes the transmission gear ratio of the transmission within a range in which the one-way clutch is brought into the non-transmission state.

5. The drive system according to claim 1, wherein when performing the coasting control, the control means changes the engine rotation speed of the internal combustion engine to a rotation speed according to the vehicle speed.

6. The drive system according to claim 2, wherein when performing the coasting control, the control means changes the engine rotation speed of the internal combustion engine to a rotation speed according to the vehicle speed.

7. The drive system according to claim 3, wherein when performing the coasting control, the control means changes the engine rotation speed of the internal combustion engine to a rotation speed according to the vehicle speed.

8. The drive system according to claim 4, wherein when performing the coasting control, the control means changes the engine rotation speed of the internal combustion engine to a rotation speed according to the vehicle speed.

9. The drive system according to claim 1, further comprising an engagement determination means that determines a transmission state or non-transmission state of the one-way clutch, wherein when the coasting determination means determines not to perform the coasting control when performing the coasting control, and the engagement determination means determines that the one-way clutch is in the transmission state, the control means changes the transmission gear ratio of the transmission to the transmission gear ratio calculated by the calculation means.

10. The drive system according to claim 1, further comprising:
a swing conversion means including a rotation portion that is rotated by a rotation movement of a drive shaft connecting the internal combustion engine with the transmission, and a swing portion that performs a swing movement by a rotation of the rotation portion, the swing conversion means converting the rotation movement of the drive shaft into the swing movement;
the one-way clutch that transmits a power in one way of the swing movement of the swing portion to the output shaft where the angular velocity of the swing portion performing the swing movement is equal to or higher than a rotation speed of the output shaft; and
a rotation radius variable mechanism that can change an angular velocity of the swing portion by varying a rotation radius of the rotation portion.

11. The drive system according to claim 9, further comprising:
a swing conversion means including a rotation portion that is rotated by a rotation movement of a drive shaft connecting the internal combustion engine with the transmission, and a swing portion that performs a swing movement by a rotation of the rotation portion, the swing conversion means converting the rotation movement of the drive shaft into the swing movement;
the one-way clutch that transmits a power in one way of the swing movement of the swing portion to the output shaft where the angular velocity of the swing portion performing the swing movement is equal to or higher than a rotation speed of the output shaft; and
a rotation radius variable mechanism that can change an angular velocity of the swing portion by varying a rotation radius of the rotation portion.

\* \* \* \* \*